3,461,186
RAPID-CURING RESIN COMPOSITIONS
Francis R. Galiano, Prairie Village, and Robert W. Hill, Leawood, Kans., assignors to Gulf Research & Development Company, Pittsburgh, Pa., a corporation of Delaware
No Drawing. Filed Nov. 2, 1966, Ser. No. 591,435
Int. Cl. C08f 29/00; C08g 37/32, 37/34
U.S. Cl. 260—850                                       6 Claims

ABSTRACT OF THE DISCLOSURE

Rapid-curing resin compositions for use in making transparent, glossy durable coatings, particularly on paperboard cartons, comprise, for example, a combination of a styrene-methacrylaldehyde-alkyl methacrylate interpolymer, urea-formaldehyde or a melamine-formaldehyde aminoplast resin and a benzenedicarboxylic acid polyester resin. A substantial proportion of aldehyde substituent groups in the interpolymer assures rapid curing characteristics.

DESCRIPTION OF THE INVENTION

The use of coatings on substrates such as paper and thermoplastic polymer articles has found widespread use in industry. Generally, these coatings are applied to improve the characteristics of the articles for aesthetic purposes, printability and to provide resistance of printing to various liquids as well as resistance of the substrate to permeation by vapors and liquids. However, many of the coatings that have been available for this purpose have been deficient in various respects. For example, although moderately successful for coating stiff plastic articles, many of the coating compositions presently available tend to be brittle and crack on flexing. This militates against the use of such coatings on printed paperboard articles such as cardboard shipping cartons, which must be able to withstand wetting and rough handling, as in shipping products which are kept under refrigeration. For this type of application, a coating is desired which will remain transparent, glossy and continuous and protect the paperboard and printing thereon, even though subjected to wetting with both water and common solvents, folding, denting and abrasion. In addition, any coating which is put on paperboard must cure rapidly enough so that high speed coating techniques can be employed.

It has now been discovered that a particularly desirable combination of characteristics is obtained by employing coating compositions comprising the following components:

(A) an aldehyde-containing interpolymer of styrene containing from about 35 percent to about 75 percent of chemically combined styrene, 20 to 40 percent of a co-monomer selected from the group consisting of acrolein and methacrolein, and from 0 to 30 percent of an ester selected from alkyl acrylates and alkyl methacrylates;
(B) a curable aminoplast capable of reacting with aldehyde substituent groups and selected from the class of urea-formaldehyde condensation products, polyalkylol melamines and poly(alkoxyalkyl) melamines; and
(C) a polyester produced by condensation of:
   (1) a trihydric alcohol,
   (2) a dihydric alcohol, and
   (3) at least one dicarboxylic acid selected from the group consisting of
     (a) benzenedicarboxylic acids and
     (b) aliphatic dicarboxylic acids containing from 5 to 12 carbon atoms.

Suitable materials for use in the compositions of this invention are discussed below.

(A) Aldehyde-containing interpolymers

The aldehyde-containing interpolymers employed in the compositions of this invention are of critical importance for rapid curing behavior and appear also to contribute to the durable gloss and impact resistance of finished coatings. Suitable interpolymers and a typical procedure for preparation are illustrated below. Parts given are parts by weight unless otherwise indicated.

Freshly distilled methacrolein (500 parts, no inhibitor present) was mixed with 500 parts of polymerization grade styrene, 251 parts of methyl methacrylate (inhibitor content, 10 p.p.m.) and 555 parts of xylene. Azobisisobutyronitrile (9.4 parts) was added and the solution was heated to 80° C. under an inert atmosphere, with stirring. After 15 minutes at 80° C. the temperature suddenly rose to 93–94° C. and refluxing of the mixture began. The mixture was cooled to 80° C. and maintained at this temperature for 4 hrs. At this time 6.2 parts of azobisisobutyronitrile was added and the temperature was maintained at 80° C. for another 18 hours. Solvent and unreacted monomers were removed by heating to 240° C. under reduced pressure. The molten polymer product was then poured into aluminum pans and allowed to cool and solidify. The yield was 783 parts of a product having a softening range of 77 to 81° C. The resin had good solubility in 2-butanone, mixtures of xylene with 2-butanone and dioxane.

By employing procedures essentially the same as that described above, other suitable aldehyde-containing interpolymers may be made with proportions of co-monomers as indicated in the table below:

|  | Percent methacrolein | Percent acrolein | Percent methyl methacrylate | Percent methyl acrylate |
|---|---|---|---|---|
| Percent styrene: |  |  |  |  |
| 50 | 30 | 0 | 20 | 0 |
| 50 | 35 | 0 | 15 | 0 |
| 75 | 25 | 0 | 0 | 0 |
| 60 | 0 | 25 | 0 | 15 |
| 50 | 25 | 5 | 0 | 20 |

Generally speaking, a substantial proportion of unsaturated aldehyde is desirable in the interpolymers to maintain rapid curing characteristics in coating compositions. The polymers containing larger proportions of styrene are more suitable for making hard coatings, whereas flexibility and deformability of coatings are increased by using polymers containing larger proportions of alkyl acrylates and methacrylates. Molecular weights of typical interpolymers lie between about 1000 and 3000.

(B) Curable aminoplasts

The triazine aminoplast curing agents comprehended in this invention are any of the solvent soluble polyalkylol-melamine-aldehyde or polyalkoxyalkyl melamine-aldehyde reaction products well known in the art, and which are able to react with aldehyde substituent groups. These resins can be synthesized in any appropriate manner, and it is only necessary that they be in the uncured state and solvent soluble, i.e., as intermediate products (hereinafter referred to as precondensates) capable of further condensation (curing) on heating, with or without a catalyst. Typical examples of these aminoplast curing agents are the thermosetting melamine-formaldehyde resins and the polyalkyl ethers of melamine-formaldehyde resins, as for example the polymethylol-melamines and polymethoxymethylmelamines. These curable triazine aminoplasts can be used alone or in admixture with one another. Representative of these triazine aminoplasts are tetrahydroxymethylmelamine, pentahydroxymethylmelamine, hexahydroxymethylmelamine, and trihydroxymethylmelamine and the alkyl ether derivatives thereof. Also mixed ethers of tri-, tetra-, penta-, or hexahydroxymethylmelamines containing, for example, both methoxy and butoxy groups or both methoxy and hexyloxy groups can be used in this invention.

The etherified melamine aminoplasts are easily prepared by reacting the hydroxymethylmelamines (such as tetra-, penta- or hexamethylolmelamine) with a large excess of an aliphatic saturated monohydric alcohol having from 1 to 6 carbon atoms, and conducting the reaction under acid conditions at reflux temperature of the alkanol reagent. Mixed ethers can be prepared by an interchange reaction wherein an aliphatic alcohol having 2 or more carbon atoms is added to an alkylol-melamine (such as hydroxymethylmelamine) which has been etherified with an aliphatic alcohol having a lesser number of carbon atoms while the etherified melamine is in a solution in a suitable inert solvent. For example, when butanol is added to a solution of methylated hexamethylol melamine, the butanol reacts with the methylated melamine and replaces the pendant methyl groups with butyl groups.

Typical commercially available triazine aminoplast resins which may be employed in this invention are set forth in the table below.

AMINOPLAST RESIN PRECONDENSATES

| Trade Name | Type | Source |
|---|---|---|
| Cymel 245-8 | Butylated melamine formaldehyde | Am. Cyanamid. |
| Cymel 248-8 | do | Do. |
| Cymel 247-10 | do | Do. |
| Cymel 301 | Hexamethoxymethylmelamine | Do. |

The urea-formaldehyde condensation products are aminoplasts which are also readily available commercially and may be manufactured by known procedures. (See, for example, Preparative Methods of Polymer Chemistry by W. R. Sorenson and T. W. Campbell, Interscience, 1961). Examples of commercial products which are particularly useful and economical are butylated urea-formaldehyde resins sold under the trade names Uformite F–233 and F–240N and Resimene U–920 and U–933.

(C) Polyester condensation products

The polyester condensation product employed in the compositions of this invention consists of the reaction product of (1) an aliphatic dihydric alcohol, (2) an aliphatic trihydric alcohol, and (3) one or more dibasic acids containing from 5 to 12 carbon atoms and preferably two dibasic acids of which one acid is either a benzenedicarboxylic acid or cycloaliphatic dicarboxylic acid and where the second acid is a saturated acyclic aliphatic dicarboxylic acid. The proportions of the polyester components are not considered critical, and various ratios thereof may be used which will provide a hydroxyl number of about 80 to 175 for the polyester product. In preparing the polyester, suitable mole ratios of the various components may range as follows: 1.5 to 2 moles of the dihydric alcohol per mole of the trihydric alcohol; 2 to 3 moles of total dicarboxylic acids per mole of the trihydric alcohol; and where a combination of acids is employed, the ratio of total acids may range from 0 to 4 moles of either the benzenedicarboxylic acid or the cyclic aliphatic dicarboxylic acid per mole of acyclic aliphatic dicarboxylic acid. Ordinarily, the proportion of the di-acids and dihydric and trihydric alcohols will be such that the resultant polyester will have a hydroxyl number in excess of 80 and preferably in excess of 100. Also, the polyester will have an acid number in the range of about 15 to 35 and preferably 15 to 25. The term "benzenedicarboxylic acid" is employed to define dicarboxylic acids and anhydrides thereof based on a single substituted or unsubstituted benzene ring. In general, as indicated above, the dicarboxylic acid will contain 5 to 12 carbon atoms; however, where the indicated combination of acids is employed, the benzenedicarboxylic acid will contain from 8 to 12 carbon atoms and the cyclic and acyclic saturated di-acids will contain from 5 to 12 carbon atoms. Typical benzenedicarboxylic acids include phthalic acid (preferably used as the anhydride), terephthalic acid, isophthalic acid, 5 - tert-butyl isophthalic acid, with the 1,2-cyclohexanedicarboxylic acid illustrative of a suitable cycloaliphatic dicarboxylic acid. The acyclic dicarboxylic acids are the saturated aliphatic acids which include glutaric acid, adipic acid, sebacic acid, docosanedioic acid and the like.

The dihydric alcohols which may be employed are the aliphatic alcohols which contain from 2 to 8 carbon atoms, and include ethylene glycol, 1,3-propylene glycol, 1,3-butylene glycol, 1,4-butylene glycol, neopentyl glycol, 2,2,4-trimethyl pentanediol and the like.

Suitable trihydric alcohols are aliphatic alcohols which contain from 3 to 6 carbon atoms, such as glycerol, trimethylol propane, trimethylol ethane, 1,2,6-hexanetriol and the like.

A particularly effective polyester when blended with the other ingredients to provide the compositions of this invention will preferably comprise the product of condensation of the following: (1) 15 to 25 mole percent of a tris hydroxymethyl substituted hydrocarbon having from 2 to 3 carbon atoms (trimethylolethane and trimethylol propane) (2) 25 to 40 mole percent of a saturated 1,3-diol having from 3 to 5 carbon atoms and a chain length of 3 to 4 carbon atoms, (as for example, neopentyl glycol and 1,3-butylene glycol) and (3) dicarboxylic acids consisting of (a) 15 to 30 mole percent benzenedicarboxylic acid and (b) 15 to 25 mole percent adipic acid. If desired, for specialty applications, modest quantities of monobasic acids may be employed in the polyester, as for example those derived from fatty oils, tall oil fatty acids, soybean fatty acids, linseed oil fatty acids, etc.

The polyesters can be prepared by techniques normally employed in the manufacture of the well-known alkyd resins. A convenient way of preparing the polyesters is to charge the reactants to a stirred vessel and heat to temperatures in excess of 100° C., as for example 145° C. to 240° C., which will be sufficient to esterify the carboxyl and hydroxyl groups of the reactants charged. The liberated water is removed by distillation. The reaction will be continued with evolution of water until the polyester resin is rather viscous and the acid number is reduced to below 35 and preferably to a value in the range of about 15 to about 25.

Typical polyester resin components and their methods of preparation are set forth below, with all parts and percentages given as parts and percentages by weight, unless otherwise indicated.

Polyester resin A.—A mixture of 128.5 grams (0.96 mole) or trimethylol propane, 499 grams (4.8 moles) neopentyl glycol, 498 grams (3.0 moles) isophthalic acid and 292 grams (2.0 moles) of adipic acid was heated for 1 hour and 52 minutes at 181° C. followed by heating at 200–236° C. for 3 hours and 34 minutes to give 1135 grams of a product having an acid number of 19.9 (mg. KOH per gram of resin), and hydroxyl number of about 140.

Polyester resin B.—A mixture of 579 grams (4.33 moles) of trimethyl propane, 789 grams (7.60 moles) neopentyl glycol, 999 grams (6.75 moles) of phthalic anhydride and 657 grams (4.50 moles) of adipic acid was slowly heated during 6½ hours to 240° C. to obtain a resin having an acid number of 22.1 and a hydroxyl number of 140.

Polyester resin C.—A mixture of 257 grams (1.92 moles) trimethylol propane, 225 grams (2.5 moles) 1,3-butylene glycol, 740 grams (5.0 moles) phthalic anhydride and 91.6 grams (0.88 mole) neopentyl glycol was slowly heated over 6½ hours to 218° C. to obtain a polyester having an acid number of 31.5 and a hydroxyl number of 150.

Polyester Resin D.—A mixture of 1210 grams (9.03 moles) trimethylol propane, 1649 grams (15.9 moles) neopentyl glycol, 2088 grams (14.1 moles) phthalic anhydride, 1373 grams (9.4 moles) adipic acid and 60 grams of xylene was slowly heated over 8 hours and 42 minutes to an acid number of 23.2 to obtain a polyester having a hydroxyl number of 140.

Polyester resin E.—A mixture of 789 grams (7.60 moles) of neopentyl glycol, 999 grams (6.75 moles) phthalic anhydride, 513 grams (4.28 moles) of trimethylol ethane, 657 grams (4.50 moles) of adipic acid and 50 ml. xylene was heated slowly over 5 hours to 240° C., and maintained at temperature for 1½ hours to an acid number of 22.9. 2593 grams of the polyester was obtained.

(D) Modifying components

Physical characteristics of the compositions of this invention are readily modified by use of solvents, solid fillers, delustering agents, pigments and thickeners which are conventionally employed with organic coating compositions. Ketone solvents such as 2-butanone are conveniently used for viscosity modification and to accelerate setting up of the coating. The flexibility of coatings is modified in the conventional manner by use of plasticizers or softeners and solid fillers. Suitable modifiers are included in the compositions which are specifically exemplified below.

EXAMPLE I

A terpolymer of methocrolein, styrene and methyl methacrylate was prepared which had the following properties:

Composition:
    Methacrolein _____percent__ 30
    Methyl methacrylate _____do____ 20
    Styrene _____do____ 50
Molecular weight _____ 1200–1300
Softening point, ° C. _____ 60

Formulations were prepared using the terpolymer, polyester resin D and either Cymel 301 or Uformite F–240N. The mixtures were catalyzed, coated onto steel "Q" panels and baked 5 minutes at 150° C. The gloss, impact resistance, conical bend, abrasion resistance and solvent resistance were determined. In addition, the formulations were coated on flamed polyethylene and the adhesion, flexibility and gloss evaluated. Coatings on glass slides were used to determine compatibility and $NH_4OH$ resistance. The formulations which were evaluated and the results of the tests are given in Table I. In each case the ratio of the polyester to Cymel 301 or the Uformite F–240N was kept constant and the terpolymer concentrations varied. The catalyst used was p-toluenesulfonic acid at 2% concentration. The results show these formulations yield hard coatings on flexible and rigid substrates of a variety of types and possess good resistance to ammonium hydroxide. These formulations are illustrative of the type more suitable for use on rigid substrates. When coated on metal and cured at temperatures as high as 150° F., it has been discovered that the curing time of 5 minutes is much more than adequate, so that high speed coating is feasible.

TABLE I.—EVALUATION OF RESIN FORMULATIONS

| Component | Formulations | | | | | |
|---|---|---|---|---|---|---|
| | 1 | 2 | 3 | 4 | 5 | 6 |
| Polyester D at 50% solids [1], g | 53.6 | 50.0 | 46.4 | 53.6 | 50.0 | 46.4 |
| Cymel 301 at 50% solids [1], g | 21.4 | 20.0 | 18.6 | | | |
| Uformite F–240N at 50% solids [2], g | | | | 21.4 | 20.0 | 18.6 |
| Terpolymer at 50% solids [2], g | 25.0 | 30.0 | 35.0 | 25.0 | 30.0 | 35.0 |
| Santicizer 141, g | 5.0 | 5.0 | 5.0 | 5.0 | 5.0 | 5.0 |
| Methanol, ml | 3.0 | 3.0 | 3.0 | 3.0 | 3.0 | 3.0 |
| Catalyst solution at 25% solids [3] | 4.0 | 4.0 | 4.0 | 4.0 | 4.0 | 4.0 |
| Coating on steel panels, cured 5 min. at 150° C.: | | | | | | |
| Gloss, 60° [4] | 46 | 43 | 44 | 44 | 44 | 44 |
| Impact resistance, inch/lb | <20 | <20 | <20 | <20 | <20 | <20 |
| Sward hardness | 46 | 44 | 58 | 41 | 43 | 38 |
| Conical bend ⅛ in | Fail | Fail | Fail | Fail | Fail | Fail |
| MEK resistance | Sl. attack | Sl. attack | Sl. attack | Attack | Attack | Attack |
| Abrasion resistance [5] | 17.7 | 17.7 | 21.3 | 25.2 | 43.5 | 36.5 |
| Coatings on Polyethylene [6], cured 15 min. at 80° C.: | | | | | | |
| Gloss, 60° | 24 | 26 | 30 | 27 | 29 | 27 |
| Flexibility | Good | Good | Good | Good | Good | Good |
| Scotch tape adhesion | Fail | Pass | Pass | Pass | Pass | Fail |
| Coating on glass cured 15 min. at 80° C.: | | | | | | |
| Compatibility | C | C | C | C | C | C |
| $NH_4OH$ resistance [7] | Pass | Pass | Pass | Pass | Pass | Pass |

[1] In nitropropane.
[2] In xylene.
[3] p-Toluenesulfonic acid in isopropanol.
[4] Calibrated to gloss of 10 on a Std. 40 gloss plate.
[5] Taber abrader CS-10 calibrase wheel 1,000 g. weight, 500 cycles, wt. loss in milligrams.
[6] Flamed ⅛ inch thick polyethylene sheet, low density.
[7] 30 min. exposure to 5% $NH_4OH$ solution.

EXAMPLE II

A second series of formulations was prepared in which the terpolymer concentration was held constant and the aminoplast/polyester ratio was varied. The formulations evaluated and the test results are given in Table II. The best results were obtained with a Uformite/polyester/terpolymer ratio of 40/40/20. Although these formulations containing the urea resins are somewhat less abrasion resistant and solvent resistant, they have outstanding resistance to bending and impact, even when coated on a hard metal substrate, the bending of which can subject the coating to severe stresses.

diluted to make four dilute coating formulations. These formulations were then coated on glass and the smoothness was judged, as shown in Table V below.

TABLE II.—EVALUATIONS OF RESIN FORMULATIONS

| Component | 1 | 2 | 3 | 4 |
|---|---|---|---|---|
| Polyster D at 50% solids¹, g | 60 | 50 | 40 | 30 |
| Uformite F-233 at 50% solids, g | 20 | 30 | 40 | 50 |
| Terpolymer at 50% solids¹, g | 20 | 20 | 20 | 20 |
| Santicizer 141, g | 5 | 5 | 5 | 5 |
| Methanol, ml | 3 | 3 | 3 | 3 |
| Catalyst Solution at 25% solids², g | 2 | 2 | 2 | 2 |
| Coatings on steel panels cured 5 min. at 150° C.: | | | | |
| Gloss, 60°³ | 41 | 43 | 43 | 42 |
| Impact resistance, inch/lb | 20 | 80 | 120 | 20 |
| Sward hardness | 29 | 41 | 53 | 55 |
| Conical bend, ⅛ in | Pass | Pass | Pass | Pass |
| MEK resistance | Sl. attack | Sl. attack | Sl. attack | Sl. attack |
| Abrasion resistance⁴, mg | 40.5 | 33.6 | 22.5 | 30.9 |
| Coatings on polyethylene⁵, cured 15 min. at 80° C.: | | | | |
| Gloss, 60° | 23 | 21 | 24 | 24 |
| Flexibility | Good | Good | Good | Good |
| Scotch tape adhesion | Pass | Pass | Pass | Pass |
| Coatings on glass cured 15 min. at 80° C.: | | | | |
| Compatibility | C | C | C | C |
| NH₄OH resistance⁶ | Pass | Pass | Pass | Pass |

¹ In xylene.
² p-Toluenesulfonic acid in isopropanol.
³ Calibrated to gloss of 10 on a Std. 40 gloss plate.
⁴ Taber abrader CS-10 calibrase wheel, 100 g. weight, 500 cycles, weight loss.
⁵ Flamed ⅛ inch thick polyethylene sheet, low density.
⁶ 30 min. exposure to a 5% NH₄OH solution.

EXAMPLE III

Formulations were prepared using the terpolymer of Example I with polyester resin D in such proportions as to provide compositions useful for a variety of purposes, including coating printed paperboard for shipping cartons. The formulations are shown in Table III. Plasticizer (Santicizer 141) was added to each at 10 percent on solids. Two samples from each solution were cured on glass test tubes at each cure cycle listed in Table IV. The cured samples were immersed in (1) 5% NH₄OH and (2) 95% ethanol and the time to failure of each was noted. On the basis of the test results, formulation 2 of Table III was chosen as preferred, because it consistently produced the best coatings, even at the shortest curing times. This formulation was then tested on a variety of solid substrates, with satisfactory results.

TABLE III.—FORMULATIONS CONTAINING POLYESTER D, CYMEL 301 AND TERPOLYMER OF EXAMPLE I

| | 1 | 2 | 3 | 4 | 5 |
|---|---|---|---|---|---|
| Polyester D | 7.0 | 5.0 | 4.0 | 4.0 | 5.5 |
| Example I terpolymer | 1.5 | 3.0 | 4.5 | 2.0 | 2.0 |
| Cymel 301 | 1.5 | 2.0 | 1.5 | 4.0 | 2.5 |
| Santicizer 141 | 1.0 | 1.0 | 1.0 | 1.0 | 1.0 |
| Methanol | 1.0 | 1.0 | 1.0 | 1.0 | 1.0 |
| 2-butanone | 15 | 15 | 15 | 15 | 15 |
| p-Toluenesulfonic acid | 0.2 | 0.2 | 0.2 | 0.2 | 0.2 |

TABLE IV.—CURE CYCLES FOR FORMULATIONS SHOWN IN TABLE III

| 170° F. | 190° F. | 300° F. |
|---|---|---|
| 3 min | 2 min | 1 min. |
| 5 min | 4 min | 2 min. |
| 15 min | 10 min | |

EXAMPLE IV

Diluted coating formulations suitable for use in high speed coating processes were prepared, employing a variety of solvents. First, a stock solution was prepared as shown in Table V and the stock solution was further diluted to make four dilute coating formulations. These formulations were then coated on glass and the smoothness was judged, as shown in Table V below.

TABLE V

| Stock Solution | Coating solutions, g. |
|---|---|
| Polyester D | 150 |
| Ex. 1 terpolymer | 90 |
| Cymel 301 | 60 |
| Santicizer 141 | 30 |
| Methanol | 15 |
| 2-butanone | 95 |
| Percent solids | 75 |

| Working solutions | 1 | 2 | 3 | 4 |
|---|---|---|---|---|
| Stock solution, parts | 53.3 | 53.3 | 53.3 | 53.3 |
| n-Butanol, parts | 46.7 | | | |
| Cellosolve acetate, parts | | 46.7 | | |
| Xylene, parts | | | 46.7 | |
| 2-butanone, parts | | | | 46.7 |
| Viscosity (cps.) | 34 | 31 | 22 | 12 |
| Percent solids | 41.3 | 40.7 | 40.1 | 40.3 |
| Coating characteristics (4=Smoothest) | 2 | 4 | 3 | 1 |

Formulation number 2 yielded the smoothest coating and is preferred where highest gloss and transparency are desired. If a transparent finish free from specular reflections is desired, this may be obtained more conveniently by adding a conventional flatting agent, for example silica aerogel, to one of the other formulations, preferably formulation number 3. Printed paperboard bearing a cured coating of one of these formulations retains its good appearance in spite of wetting and rough handling.

The above examples illustrate variations in the compositions of this invention which render them useful for forming coatings with surface characteristics ranging from hard and glossy to flexible and extremely impact resistant, with satisfactory adhesion to many different solid substrates. The example which follows is illustrative of a preferred use of the compositions of this invention in the high speed coating of paper to yield a glossy, durable surface finish.

EXAMPLE V

A solution was prepared containing 12 parts of the terpolymer of Example I and 20 parts of polyester E in 58 parts of 2-nitropropane. To this solution was added 8 parts of Cymel 301, 4 parts of Santicizer 141 and 2 parts of methanol and approximately 0.8 part of p-toluenesulfonic acid (about 2 percent of total solids content). The mixture was stirred to obtain a homogenous coating composition which was then coated on paper and cured for 30 seconds at 150° C. The results are summarized in Table VI.

TABLE VI

Coating wt. (lb./3000 ft.$^2$) _____ 3.0
Gloss at 60° angle _____ 63.7
Appearance _____ Excellent
Coefficient of friction:
   Static _____ 0.80
   Kinetic _____ 0.65
Solvent resistance (No. of strokes to mar finish):
   2-butanone _____ 160
   2-propanol _____ 200+
   Methanol _____ No effect
Resistance to penetration by dyed turpentine
(Time/No. of pinholes):
   Flat _____ 60 sec./1
   Creased _____ 5 sec./3

The finish, as shown by the test results, is a glossy, durable, low-friction type such as is particularly desirable in packaging applications.

What is claimed is:
1. A heat curable composition comprising a mixture of:
  (A) From 15 to 45 percent by weight of an aldehyde-containing interpolymer of styrene containing from about 35 percent to about 75 percent of chemically combined styrene, 20 to 40 percent of a comonomer selected from the group consisting of acrolein and methacrolein, and from 0 to 30 percent of an ester selected from alkyl acrylates and alkyl methacrylates;
  (B) From 15 to 50 percent by weight of a curable aminoplast capable of reacting with aldehyde substituent groups and selected from the class consisting of urea-formaldehyde condensation products, polyalkylol melamines and poly(alkoxyalkyl) melamines; and
  (C) From 30 to 70 percent by weight of a polyester produced by condensation at a temperature in excess of 100° C. of
    (1) a trihydric alcohol,
    (2) from 1.5 to 2 moles of a dihydric alcohol per mole of trihydric alcohol, and
    (3) from 2 to 3 moles of at least one dicarboxylic acid per mole of trihydric alcohol, selected from the group consisting of
      (a) benzenedicarboxylic acids, and
      (b) saturated aliphatic dicarboxylic acids containing from 5 to 12 carbon atoms, said polyester having an acid number in the range of 15 to 35 and a hydroxyl number in excess of 80.

2. A heat curable composition comprising a mixture of:
  (A) From 15 to 45 percent by weight of an aldehyde-containing interpolymer of styrene containing from about 35 percent to about 75 percent of chemically combined styrene, 20 to 40 percent of a comonomer selected from the group consisting of acrolein and methacrolein, and from 0 to 30 percent of an ester selected from alkyl acrylates and alkyl methacrylates;
  (B) From 15 to 50 percent by weight of a curable aminoplast capable of reacting with aldehyde substituent groups and selected from the class consisting of urea-formaldehyde condensation products, polyalkylol melamines and poly(alkoxyalkyl) melamines; and
  (C) From 30 to 70 percent by weight of a polyester produced by condensation at a temperature in excess of 100° C. of
    (1) 15 to 25 mole percent of a tris hydroxymethyl substituted hydrocarbon having from 2 to 3 carbon atoms, and
    (2) 25 to 40 mole percent of a saturated 1,3-diol having from 3 to 5 carbon atoms and a chain length of 3 to 4 carbon atoms with
    (3) dicarboxylic acids consisting of
      (a) 15 to 30 mole percent benzene dicarboxylic acid, and
      (b) 15 to 25 mole percent adipic acid, said polyester having an acid number in the range of 15 to 35 and a hydroxyl number in excess of 80.

3. A heat curable composition comprising a mixture of
  (A) From 15 to 45 percent by weight of an aldehyde-containing interpolymer of styrene containing about 50 percent of chemically combined styrene, about 30 percent methacrolein and about 20 percent methyl methacrylate;
  (B) From 15 to 50 percent by weight of a curable aminoplast capable of reacting with aldehyde substituent groups and selected from the class consisting of urea-formaldehyde condensation products, polyalkylol melamines and poly(alkoxyalkyl) melamines; and
  (C) From 30 to 70 percent by weight of a polyester produced by condensation at a temperature in excess of 100° C. of
    (1) trimethylol propane,
    (2) neopentyl glycol, and
    (3) a mixture of phthalic anhydride and adipic acid, said polyester having an acid number in the range of 15 to 35 and a hydroxyl number in excess of 80.

4. A heat curable composition comprising a mixture of:
  (A) From 15 to 45 percent by weight of an aldehyde-containing interpolymer of styrene containing about 50 percent of chemically combined styrene, about 30 percent methacrolein and about 20 percent methyl methacrylate;
  (B) From 15 to 50 percent by weight of a curable aminoplast capable of reacting with aldehyde substituent groups and selected from the class consisting of urea-formaldehyde condensation products, polyalkylol melamines and poly(alkoxyalkyl) melamines; and
  (C) From 30 to 70 percent by weight of a polyester produced by condensation at a temperature in excess of 100° C. of
    (1) trimethylol ethane,
    (2) neopentyl glycol, and
    (3) a mixture of phthalic anhydride and adipic acid, said polyester having an acid number in the range of 15 to 35 and a hydroxyl number in excess of 80.

5. An article of manufacture consisting of paper bearing thereon a cured coating of a composition comprising a mixture of:
  (A) From 15 to 45 percent by weight of an aldehyde-containing interpolymer of styrene containing from about 35 percent to about 75 percent of chemically combined styrene, 20 to 40 percent of a comonomer selected from the group consisting of acrolein and methacrolein, and from 0 to 30 percent of an ester selected from alkyl acrylates and alkyl methacrylates;
  (B) From 15 to 50 percent by weight of a curable aminoplast capable of reacting with aldehyde substituent groups and selected from the class consisting of urea-formaldehyde condensation products, polyalkylol melamines and poly(alkoxyalkyl) melamines; and
  (C) From 30 to 70 percent by weight of a polyester produced by condensation at a temperature in excess of 100° C. of (1) a trihydric alcohol,
(2) from 1.5 to 2 moles of a dihydric alcohol per mole of trihydric alcohol, and
(3) from 2 to 3 moles of at least one dicarboxylic acid per mole of trihydric alcohol, selected from the group consisting of
   (a) benzenedicarboxylic acids, and
   (b) saturated aliphatic dicarboxylic acids containing from 5 to 12 carbon atoms, said polyester having an acid number in the range of 15 to 35 and a hydroxyl number in excess of 80.

6. An article of manufacture consisting of paper bearing thereon a cured coating of a composition comprising a mixture of:
(A) From 15 to 45 percent by weight of an aldehyde-containing interpolymer of styrene containing about 50 percent of chemically combined styrene, about 30 percent methacrolein and about 20 percent methyl methacrylate;
(B) From 15 to 50 percent by weight of a curable aminoplast capable of reacting with aldehyde substituent groups and selected from the class consisting of urea-formaldehyde condensation products, polyalkylol melamines and poly(alkoxyalkyl) melamines; and
(C) From 30 to 70 percent by weight of a polyester produced by condensation at a temperature in excess of 100° C. of
(1) trimethylol ethane,
(2) neopentyl glycol, and
(3) a mixture of phthalic anhydride and adipic acid, said polyester having an acid number in the range of 15 to 35 and a hydroxyl number in excess of 80.

References Cited

UNITED STATES PATENTS 3,402,219   9/1968   Hill et al. _____ 260—850

SAMUEL H. BLECH, Primary Examiner

J. C. BLEUTGE, Assistant Examiner

U.S. Cl. X.R.

117—124, 132, 138, 155, 161; 260—32, 33, 855, 873